United States Patent [19]

Prahl

[11] 4,157,380

[45] Jun. 5, 1979

[54] RECOVERY OF HYDROGEN CHLORIDE AND CHLORINE FROM CHLORINE-CONTAINING ORGANIC WASTES

[76] Inventor: Walter H. Prahl, Pfaffstrasse 16, Karlsruhe, Fed. Rep. of Germany, 41

[21] Appl. No.: 745,290

[22] Filed: Nov. 26, 1976

[51] Int. Cl.$^2$ .................... B01D 53/34; C01B 7/08; C07C 17/00
[52] U.S. Cl. .................... 423/488; 423/240; 423/241; 423/481; 260/650 R; 260/659 A; 260/659 R; 260/662 A; 260/662 R
[58] Field of Search ............ 423/240, 241, 481, 488; 260/650 R, 654 R, 659 A, 659 R, 662 A, 662 R

[56] References Cited

U.S. PATENT DOCUMENTS

| | | | |
|---|---|---|---|
| 2,382,788 | 8/1945 | Gorin | 423/488 |
| 2,498,552 | 2/1950 | Kilgren et al. | 260/659 A |
| 2,575,167 | 11/1951 | Fontana et al. | 260/650 R |
| 2,666,024 | 1/1954 | Low et al. | 423/488 X |
| 2,827,502 | 3/1958 | Loeser et al. | 260/650 R |
| 3,079,444 | 2/1963 | Jacobowsky et al. | 260/654 R |
| 3,214,481 | 10/1965 | Heinemann et al. | 260/659 R |
| 3,689,578 | 9/1972 | Olson et al. | 260/659 R |
| 3,950,443 | 4/1976 | Prahl | 260/622 A |

Primary Examiner—Earl C. Thomas

Attorney, Agent, or Firm—Sidney B. Ring; Hyman F. Glass

[57] ABSTRACT

This invention relates to a process of removing chlorine (Cl$_2$) and hydrogen chloride (HCl) from a combustion gas, such as a combustion gas formed from incinerating chlorine-containing organic materials, which comprises:

(1) Lowering the temperature of the combustion gas below the melting point of cupric chloride or mixture thereof with other salts;

(2) Contacting the cooled combustion gas of step (1), in the presence of oxygen, with copper of lower than a divalent oxidation state, such as a cuprous compound or its equivalent in a quantity sufficient to absorb chlorine and hydrogen chloride present in gas, thereby converting the cuprous compound to cupric chloride (in order to absorb substantially all HCl and Cl$_2$ it is desirable to employ a stoichiometric excess of cuprous compound);

(3) Contacting cupric chloride with a reducing agent, thereby converting the cupric chloride to cuprous chloride or an equivalent compound of lower than divalent oxidation state and the reducing agent to a chlorinated product.

The products formed from the reducing agent in step (3) can be removed; and cuprous chloride formed in step (3) can be reused in step (2).

18 Claims, 10 Drawing Figures

RECOVERY OF HYDROGEN CHLORIDE AND CHLORINE FROM CHLORINE-CONTAINING ORGANIC WASTES

The chlorine consuming industry produces large quantities of chlorine-containing organic byproducts, (referred to herein as "Cl-waste"). Disposal of Cl-waste poses environmental, technical and economic problems. The conventional and environmentally least objectionable method of Cl-waste disposal is its reaction with oxygen at elevated temperatures, (referred to herein as "incineration" or "combustion"). In the combustion of Cl-waste its carbon content is converted essentially to carbon dioxide, and its hydrogen content to water, both environmentally unobjectionable. The chlorine content of Cl-waste is converted by combustion partly to hydrogen chloride and partly to chlorine. It is the presence of these two compounds in the combustion gas of Cl-waste, that is mainly responsible for the environmental, technical, and economic problems.

The conventional way of dealing with chlorine and hydrogen chloride in the combustion gases is to reduce the former to hydrogen chloride, or dispose of it in some other way, and then to absorb the hydrogen chloride in water, forming aqueous hydrochloric acid, mostly of low concentration. Although aqueous hydrochloric acid is more easily handled and less objectionable than gaseous hydrogen chloride diluted with huge quantities of the other components of the combustion gas, it is still essentially an undesired waste product, the disposal of which poses further problems. A better way of separating the chlorine and hydrogen chloride from the other components of the combustion gas of Cl-waste than absorption in water is desired. The present invention provides such a way.

One purpose of the present invention is to free Cl-waste combustion gas of chlorine and hydrogen chloride, and thereby permit the release of the combustion gas into the atmosphere. Another purpose is to recover chlorine and hydrogen chloride present in the combustion gas of Cl-waste in a compact, concentrated, and easily handled form. Another purpose is to recover the chlorine and hydrogen content of combustion gas of Cl-waste in commercially usable form. Another purpose is to recover the thermal energy of Cl-waste, liberated in its combustion, in an economically useful form. Other purposes will become apparent in the course of the description.

According to the present invention, chlorine and hydrogen chloride are separated from the combustion gas by contacting the latter with copper compounds of an oxidation stage lower than that of divalent copper, in the presence of oxygen.

Copper compounds occur in divalent (cupric) form, such as $CuCl_2$, $Cu(OH)Cl$, $Cu(OH)_2$, etc., in monovalent (cuprous) form, such as $CuCl$, $CuOH$, etc., and in a multitude of forms intermediate between the two oxidation states. These can be considered as mixtures of compounds of the two main valence states.

It was found, according to the present invention, that both, chlorine and hydrogen chloride, are practically completely separated from, and absorbed out of, the combustion gas, if the latter is contacted in the presence of oxygen with copper compounds below the divalent oxidation state. Without being bound to this explanation, it is believed that some or all of the following reactions occur:

$$CuOH + HCl = CuCl + H_2O$$

$$2\ CuCl + Cl_2 = 2\ CuCl_2$$

$$2\ CuCl + 2\ HCl + \tfrac{1}{2}\ O_2 = 2\ CuCl_2 + H_2O.$$

These and similar reactions are known to occur at high temperatures, close to the melting point of cupric chloride, and technical uses have been suggested for molten mixtures of salts containing copper compounds. In the present invention the copper compounds are contacted with the combustion gas at temperatures below the melting point of cupric chloride, and not in form of a melt, but as solids, as a slurry of solids in an aqueous solution, or as an aqueous solution.

Contact between combustion gas and copper compounds is effected in one of the many conventional ways: If in solid form, contact can be made in a stationary, a moving, or a fluidized bed. If in form of a slurry or an aqueous solution, contact can be made in a packed column, a plate column, a spray tower or any of the other contacting devices.

Since the combustion gas emanating from the zone of contact with the copper compounds is essentially free of chlorine and hydrogen chloride, and of any other objectionable substances, it can be released to the atmosphere without environmental objections.

The copper compounds, after contact with the combustion gas, are in a higher oxidation state than before, and they contain a considerable percentage of cupric chloride. In order to make them suitable for use as an absorbant of chlorine and hydrogen chloride, they have to be reduced to a lower state of oxidation. In view of the high chemical potential of one of the chlorine atoms in cupric chloride, the reduction can be carried out by a large variety of agents. Their choice is determined mostly by economic consideration, for example by the value of the produce formed in the reduction of cupric chloride.

The simplest reducing agent is hydrogen. Its reaction product is hydrogen chloride, according to the equation: $2\ CuCl_2 + H_2 = 2\ CuCl + 2\ HCl$. In that case the economic advantage of this process is the recovery and upgrading of the chlorine and hydrogen chloride from the combustion gas, in form of concentrated gaseous hydrogen chloride, rather than as dilute aqueous hydrochloric acid.

Other reducing agents are aliphatic or aromatic hydrocarbons. They are converted to the corresponding chlorinated hydrocarbons, as represented, for instance, in the case of methane, and benzene, by the equations:

$$2\ CuCl_2 + CH_4 = 2\ CuCl + HCl + CH_3Cl$$

$$2\ CuCl_2 + C_6H_6 = 2\ CuCl + C_6H_5Cl + HCl.$$

In such reactions, which are substitution reactions, only one half of the chlorine and hydrogen chloride extracted from the combustion gas goes into the chlorinated product. The other half is still in form of hydrogen chloride, although in concentrated gaseous form, rather than in form of dilute aqueous acid.

Reducing agents capable of utilizing the full quantity of chlorine and hydrogen chloride in the combustion gas are compounds capable of addition reactions. An example of such compounds is ethylene which reduces cupric chloride according to the equation:

$$2\,CuCl_2 + C_2H_4 = 2\,CuCl + C_2H_4Cl_2,$$

forming essentially pure ethylene dichloride, without byproducts. Ethylene dichloride is an important intermediate in the production of vinylchloride.

In its broadest aspect this process then comprises the steps of (1) Lowering the temperature of the combustion gas substantially below the melting point of cupric chloride or its mixture with other salts.

(2) Contacting it in the presence of oxygen with a mass containing copper of lower than divalent oxidation state in a quantity sufficient to absorb essentially all chlorine and hydrogen chloride in the gas, thereby converting the copper of lower oxidation state (cuprous) to cupric chloride. In order to absorb substantially all of the HCl and $Cl_2$ it is desirable to employ a stoichiometric excess of cuprous compound.

(3) Contacting said mass with a reducing agent, thereby converting cupric chloride to cuprous chloride or an equivalent compound of lower than divalent oxidation state, and the reducing agent to a chlorinated product which can be separated.

(4) Re-using the reduced mass of (3) in step (2).

Figure 1:
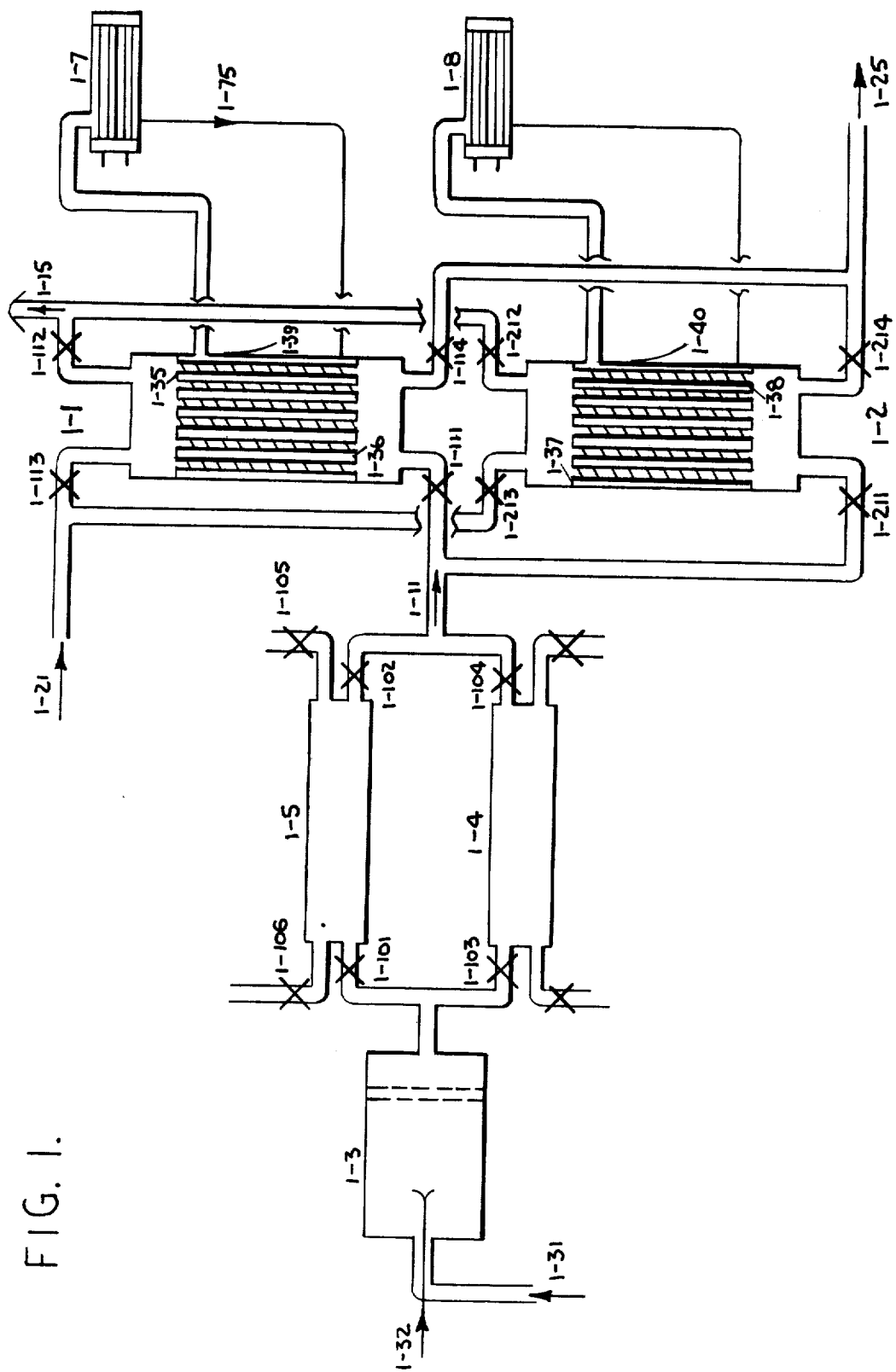
FIG. 1 is a schematic representation of one embodiment of the equipment for carrying out the process of this invention.

In order to facilitate the understanding of this invention, first a simple technical implementation will be described as Example 1, then some of the modifications will be discussed with reference to Example 1, and thereafter some of such modifications will be described in additional examples. In the drawings, the designating numbers on each Figure are prefixed with the number of the Figure. For example 1-1 indicates it is the designated number 1 in FIG. 1, 2-2 the designated number 2 in FIG. 2, etc.

EXAMPLE 1.

A schematic representation of the equipment that can be used in this example is shown in FIG. 1. 1-1 and 1-2 are stationary bed reactors containing the reaction mass and operating alternatingly in the absorption and regeneration mode. 1-3 represents the incineration system, 1-4 the device for cooling the combustion gas to reaction temperature.

200 kg per hour of a Cl-waste containing 68% chlorine is pumped through line 1-32 into one of the conventional burners for the incineration of Cl-waste. About 1100 kg/h of air is introduced through line 1-31. The heat produced in the incineration depends on the nature of the Cl-waste. As an order of magnitude rule of thumb the heat of combustion can be taken as $10{,}000 \times (1 - f_{Cl})$ Cal/kg, where $f_{Cl}$ is the weight fraction of chlorine. Thus calculated the heat developed in this case would be $10{,}000 \times (1 - 0.68) = 3200$ Cal/kg, or 640,000 Cal/hour.

The next step is to cool the combustion gases to the reaction temperature of about 200° C. That is done in cooler 1-4. In this example aiming at the greatest simplicity of equipment and operating cooling is effected in a regenerator 1-4 (i.e., a heat interchanger containing a bed of heat storing material which is alternately heated and cooled). The combustion gases enter through damper 1-101 a cylinder 1-5 filled with, for instance, coarse quartz gravel, which takes up their excess heat, and enter through damper 1-102 the reaction system. After the proper time dampers 1-101 and 1-102 are closed, dampers 1-103 and 1-104 opened, and the heat accumulated in 1-5 is taken up by a current of air entering through damper 1-105 and leaving through 1-106. The combustion gas of the desired temperature enters through line 1-11 one of two identical reactors, 1-1 and 1-2. Each reactor contains about 1 cubic meter of reaction mass, prepared by impregnating conventional catalyst pellets of alumina with about 20 weight percent copper chloride. The reaction mass is contained in about 90 4-inch pipes of about 2 meters length, welded on both ends into a tube sheet, 1-35, 1-36, 1-37, 1-38, and enclosed by a shell 1-39, 1-40. The shell contains a heat transfer liquid, such as Dowtherm ®, in order to carry off the heat of reaction. The latter amounts to about 665 Cal/kg of hydrogen chloride absorbed.

The operation of reactors 1-1 and 1-2 alternates in a cycle of about 10 minutes. Considering the part of the cycle in which reactor 1-1 is absorbing, the combustion gas enters through line 1-11 and valve 1-111 the bottom of 1-1, passes through the reaction mass, shaded in the sketch, thereby giving up its chlorine and hydrogen chloride content, and leaves through valve 1-112 and stack 1-15. The heat of reaction is taken up by the Dowtherm ® boiling in the shell. The Dowtherm ® vapors are condensed in condenser 1-7 and returned through line 1-75. The desired reaction temperature is maintained preferably by controlling the pressure under which the heat transfer liquid boils.

While reactor 1-1 operates as described, reactor 1-2 is being regenerated by passing about 4 kg/h of hydrogen through it. The hydrogen enters through line 1-21 and valve 1-213, and passes downward through the reaction mass, shaded in the sketch, reducing part of the copper chloride to cuprous chloride. The heat developed in this reaction amounts to approximately 18,000 Cal/hour. This heat is also carried off by the heat transfer liquid in the shell, and removed in condenser 1-8. About 140 kg/h of hydrogen chloride gas are liberated and leave the system through valve 1-214 and line 1-25. After about 10 minutes of operation, the operations are reversed by opening valves 1-113 and 1-114, and 1-211 and 1-212, while closing the others.

The apparatus shown schematically in FIG. 1 and described in Example 1 is one of the most inexpensive embodiments with regard to investment and one of the most simple to operate. On the other hand, however, it is wasteful of the heat energy, and its product is just gaseous hydrogen chloride. Its action is limited to the conversion of the hydrogen chloride diluted with flue gas, to a concentrated gas. Although this may be, under certain conditions, economical, it is in general more desirable to recover the chlorine content of the Cl-waste at least partially in a form other than hydrogen chloride. This is achieved, according to the present invention, by regenerating the spent reaction mass with hydrocarbons. Example 2 illustrates one way of doing that. Example 2 also illustrates a method of carrying out the alternating operations of absorbing and regenerating in a moving bed reactor system, instead of in a stationary reactor system.

EXAMPLE 2.

Figure 2:
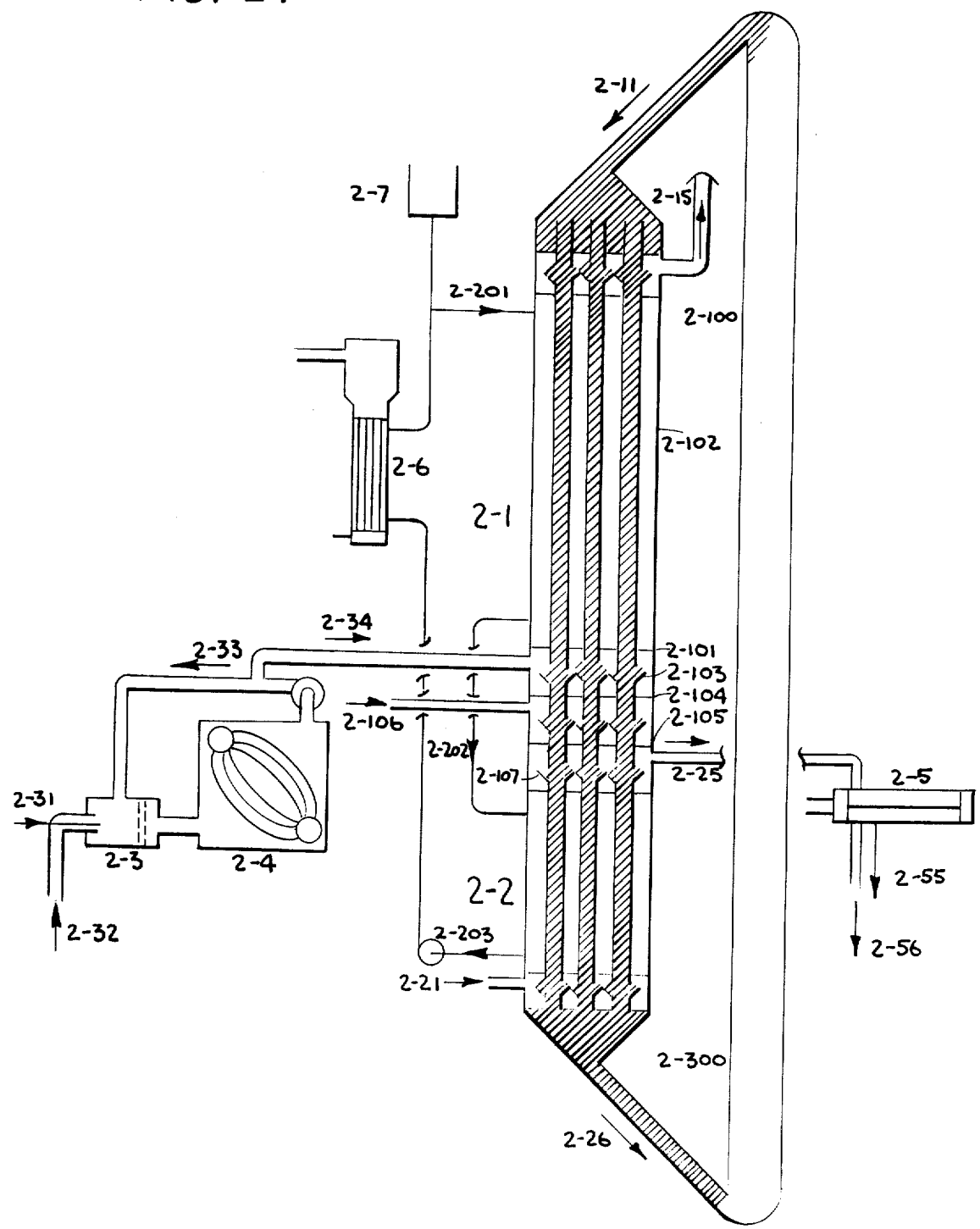
FIG. 2 is a schematic representation of another embodiment of the equipment for carrying out the process of this invention.

FIG. 2 is a schematic representation of the equipment that can be used in this example. 500 kg/h of a Cl-waste containing 68% chlorine is introduced through line 2-31 into burner 2-3, and is burned with 2750 kg/h of air entering through line 2-32. The temperature of the combustion gas is lowered to about 600° C. by introducing, through line 2-33, recycled flue gas of about 200° C. A checkerwork of firebricks promotes mixing and prevents radiation from reaching the boiler. The combustion gas passes a steam boiler, symbolized by 2-4, in which it generates about 1800 kg/h of low pressure steam, thereby being cooled to about 200° C. The mixture leaving the boiler through line 2-34 contains about, in kg/h, 158 oxygen, 2118 nitrogen, 132 water, 497 carbon dioxide, and 350 hydrogen chloride. It enters through line 2-34 the upper part, 2-1, of a moving bed reactor. 2-1 contains about 7 cubic meters of a reaction mass prepared by impregnating alumina with about 20% by weight of copper chloride. In certain cases it may be advantageous to incorporate, in addition to the copper chloride, alkali salts, such as potassium chloride, rare earth chlorides, etc., in order to prevent evaporation of copper, enhance the reactivity, etc. In general such additions are of little overall usefulness. Evaporation of copper chloride is best prevented by operating at the lowest possible temperature and by having combustion gas and regenerating gas passing the reaction mass in opposite directions. The reaction mass is contained in about 400 4-inch pipes 2-100, of about 2.5 meters length, rolled or welded on both ends into tube sheets, 2-101, and surrounded by a shell 2-102 which contains a heat transfer liquid, like Dowtherm ®.

Figure 3:
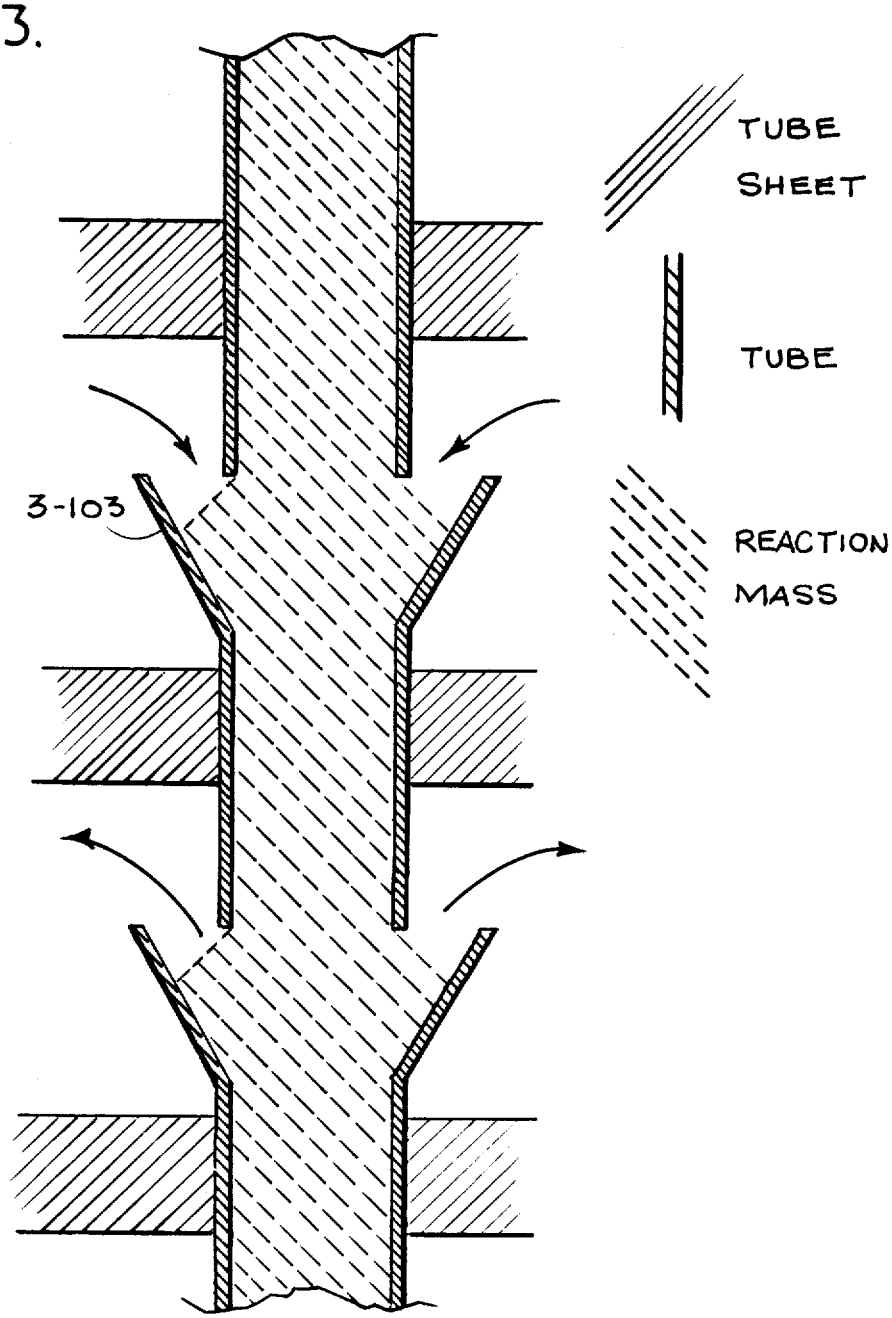
FIG. 3 is an enlarged longitudinal sectional view of a component part of the equipment shown in FIG. 2.

The problems typical for moving bed reactors, such as method of entering and leaving of the reactants, keeping the reactants from mixing, etc. are handled in any of the conventional ways. One such way is indicated in FIG. 3. The upper end of the tubes is enlarged to a funnel, 2-103 and 3-103. The lower end of the tube above reaches down to approximately the top of the funnel. The reaction mass emerging from the lower end of an upper tube forms a cone shaped pile of reaction mass, corresponding to the angle of repose of the mass. The reactant gases enter and leave through the sides of the cone, as indicated by the arrows.

The combustion gas, freed of chlorine and hydrogen chloride, leaves the system through stack 2-15. It contains approximately, in kg/h, 81 oxygen, 2113 nitrogen, 219 water, 497 carbon dioxide.

The reaction mass moves in the course of about 15 minutes from the top of the bottom of tubes 2-100. In its downward path it enters next a chamber formed by tube sheets 2-104 and 2-105. An inert gas, for instance nitrogen, or water vapor, enters this chamber through line 2-106, and flows slowly upward and downward, forming a barrier between combustion gas and regenerating gas. The reaction mass enters through funnels 2-107 the lower part 2-2 of the moving bed reactor system, essentially identical with the upper part, except that the pipes are 2 meters long. About 20 kg/h of methane enter through line 2-21, move upward in the pipes, regenerate the reaction mass, and are thereby converted into about 184 kg/h of carbon tetrachloride and 175 kg/h of hydrogen chloride. This mixture leaves reactor part 2-2 through line 2-25, and goes to condenser 2-5. Carbon tetrachloride is condensed and goes through line 2-55 for purification, while gaseous hydrogen chloride leaves through line 2-56 for further use. The regenerated reaction mass leaves 2-2 through line 2-26, and is elevated back to the top of the system, entering through line 2-11. The elevation is effected by any of the conventional means of moving granular solids. Shown here is a mechanical elevator, 2-300. Another preferred method would be an air conveyor.

While the regeneration by means of hydrogen, as in example 1, is strongly exothermic, and the regenerating reactor requires cooling, regeneration by methane is endothermic, and the lower part, 2-2, of the reactor has to be heated. That is preferably done by circulating the heat transfer fluid successively through both parts of the reactor system. Cool heat transfer liquid enters the shell part 2-1 through line 2-201, takes up the heat of absorption in 2-1, moves on through line 2-202 into the lower part, 2-2, gives off part of the heat to the tubes in 2-2. It leaves 2-2 through line and pump 2-203, and passes through a cooling device, where the rest of the excess heat is taken up, for instance by producing steam in boiler 2-6. Surge tank 2-7 keeps the cooling system full and under pressure.

The regeneration of the reaction mass by means of hydrocarbons undergoing a substitution reaction yields about one half of the original chlorine content of the Cl-waste in form of gaseous hydrogen chloride. Although under certain circumstances this may be acceptable, it will be in general more desirable to recover the whole chlorine content of the Cl-waste in form of chlorinated organic product. This is achieved, according to the present invention, by separating the hydrogen chloride from the chlorinated product and recycling the former to the absorption system.

If the chlorinated product has a fairly high boiling point, its separation from hydrogen chloride can be effected for instance by condensation, as was done for instance in example 2, in which carbon tetrachloride was condensed out of its mixture with hydrogen chloride by cooling. If, however, either the chlorinated product has a low boiling point, or if considerable quantities of a low boiling starting material have to be left unreacted, in order to obtain a low chlorination level, separation by cooling alone may not be feasible, and other means of separation may have to be resorted to. One such way is to pass the reaction mixture through a scrubbing column, to scrub out the hydrogen chloride in form of hydrochloric acid, recycle the latter to the Cl-waste incineration, and vaporize it there into the combustion gas, utilizing the heat of the gas, fully or partly, for the evaporation, and simultaneously cooling the gas to reaction temperature. This method is demonstrated in the following example.

EXAMPLE 3.

Figure 4:
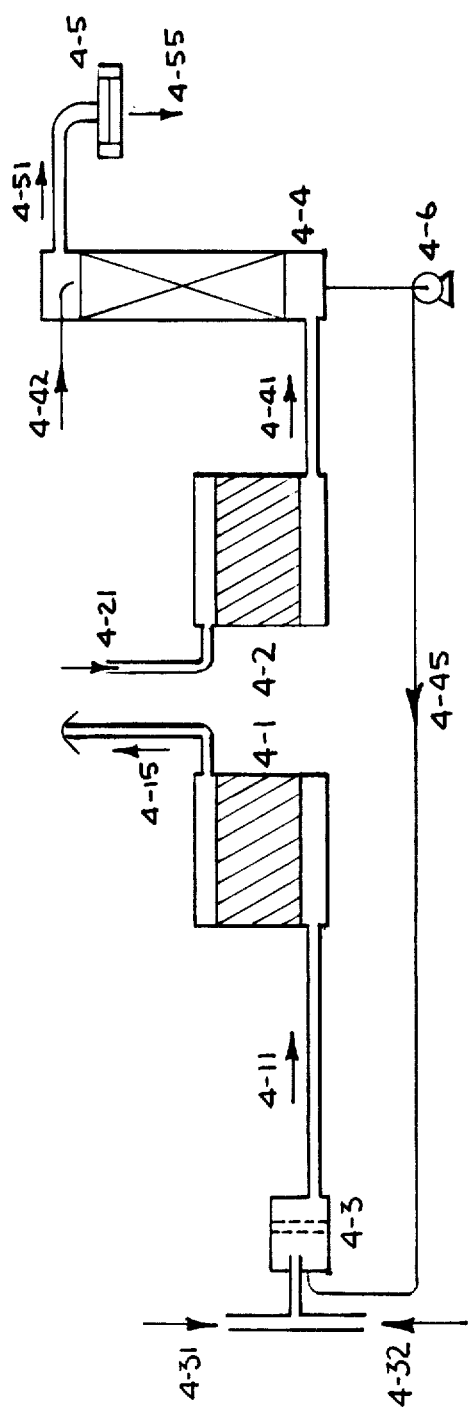
FIG. 4 is a schematic representation of another embodiment of the equipment for carrying out the process of this invention.

The equipment for this example is shown schematically in FIG. 4. 4-1 and 4-2 are the reactors containing the reaction mass in stationary beds. They operate alternatingly in a 15 minutes cycle. 4-3 is a conventional incinerator for chlorine-containing organic waste.

About 500 kg per hour of an organic waste material containing 67.5% chlorine is pumped into burner 4-3 through line 4-31. About 3160 kg/h of air enters the burner through line 4-32. About 1735 kg/h of about 20% hydrochloric acid is sprayed through line 4-45 into the burner, lowering the temperature of the combustion gas to about 200° C. The mixture of gases and vapors, containing the equivalent of about 694 kg/h of hydrogen chloride in form of mostly hydrogen chloride and some chlorine, enters reactor 4-1 through line 4-11.

Reactor 4-1 contains about 10 cubic meters of a reaction mass prepared by impregnating pellets of surface active alumina, as conventionally used as a catalyst carrier, with about 25% cupric chloride, and reducing it, as explained below, by refinery gas partly to cuprous chloride. The reaction mass is contained in about 450 pipes of about 4 inches diameter and 10 feet length, welded both sides into tube sheets, and surrounded by a mantle. The space between mantle and pipes contains a heat transfer liquid, such as Dowtherm ®. It serves to carry off the heat developed in the exothermic reaction 2 CuCl+2 HCl+½ $O_2$=2 $CuCl_2$+$H_2O$, and the other reactions leading to the formation of cupric chloride, and causing the absorption of the hydrogen chloride in the reaction mass. The heat transfer liquid is cooled partly by providing the heat for the endothermic regeneration in reactor 4-2, through which it is circulated as described in example 2, partly by conventional means, such as evaporation, circulation through a heat exchanger, or otherwise. The combustion gas, free of chlorine, hydrogen chloride or any other environmentally objectionable matter, leaves the reactor through stack 4-15 to the atmosphere.

After about 15 minutes of operation, the reaction mass approaches the limit of its capacity for absorbing hydrogen chloride, and has to be regenerated.

Reactor 4-2 is essentially identical with reactor 4-1. During the 15 minutes, that reactor 4-1 had been absorbing, the reaction mass in reactor 4-2 has been regenerated. The regenerating medium used in this case is a refinery gas containing about 30% methane and 60% ethane. About 400 kg/h of this gas enter reactor 4-2 through line 4-21. The reaction product, leaving reactor 4-2 through line 4-41, consists of about 347 kg/h hydrogen chloride, 77 kg/h methane, 140 kg/h ethane and 479 kg/h chlorination product, containing about 35% ethylene dichloride, 20% chloroethane, 25% dichloromethane, and 10% chloromethane. The reaction mixture passes through line 4-41 into column 4-4. By irrigation with water entering through line 4-42 hydrogen chloride is scrubbed out of the mixture. If desired, it could be recovered as hydrochloric acid of commercial strength. In the case of this example, however, it is recycled, through line 4-45 and pump 4-6, into the absorbing reactor. Sufficient heat is available to handle it in form of 20% or lower strength, and column 4-4 can be kept correspondingly short.

The mixture of unreacted refinery gas and the chlorinated product goes through line 4-51 to a conventional separation, here represented by a condenser 4-5, from which the chlorination products of higher boiling point emerge through line 4-55, while those of lower boiling point can, if desired, be returned, together with the unreacted gas, through line 4-21 into the regenerating reactor.

After the two reactors of FIG. 4 have been operating for about 15 minutes as described, their roles are reversed. The change-over can be effected by any of the conventional methods, for instance as shown schematically in FIG. 5, by eight valves. When valves 5-3, 5-8, 5-9, and 5-6 are open, the others closed, the combustion gas, entering through line 5-11, passes through valve 5-3 into reactor 5-1, and leaves through valve 5-8 and line 5-15 to the stack, while the regenerating gas, entering through line 5-21 and valve 5-9 passes through reactor 5-2, and leaves it through valve 5-6 and line 5-41 to the absorption column. When, in order to reverse the operation, valves 5-3, 5-8, 5-9, and 5-6 are closed, and the others opened, the combustion gas passes from line 5-11 through valve 5-5, reactor 5-2, and valve 5-10 to stack 5-15, while the regenerating gas takes the path: Line 5-21, valve 5-7, reactor 5-1, valve 5-4, line 5-41 to recovery of chlorinated product. That the reversal can be effected, for instance by three-way valves, or other means, is obvious.

FIG. 4 does not show the piping and the valves for reversing the operation, in order not to complicate the drawing.

While in the preceding paragraphs the general principle of this invention has been disclosed and illustrated by the description of three specific ways of carrying it out, in the following various modifications, the reasons for them, and the cases in which to use them, will be discussed and illustrated by other examples.

It is of the essence of this invention that both reactions, absorption of hydrogen chloride as well as regeneration, be carried out at temperatures substantially below the melting temperature of cupric chloride, in order to prevent sintering of the reaction mass with consequent loss of activity, in order to prevent side reactions, such as hydrolysis and/or other decomposition of the chlorination products, which would occur at the higher temperatures under the catalytic influence of the reaction mass, in order to avoid excessive evaporation of copper chloride, and for other reasons which will become apparent in the course of this discussion. The melting point of cupric chloride is about 500° C. Presence of salts, especially other chlorides, can lower the melting point to almost 300° C. Hydrolysis and other decomposition of many organic chlorine compounds becomes excessive near 300° C. Therefore in this invention the reaction mass is run below about 300° C. At the other end of the temperature scale, a distinction has to be made between absorption and regeneration. Absorption can be carried out at temperatures as low as room temperature or even below. The usual range is about 50° C. to 290° C., with a preferred range between about 60° C. and 280° C. The regeneration on the other hand requires a narrower temperature range. The lowest temperature at which active regeneration was observed, was 100° C., and temperatures above about 270° C. normally cause undesirable decomposition. The usual range is from about 130° C. to about 260° C., with a preferred range from about 150° C. to 250° C.

The absorption reaction is exothermic to the extent of about 665 Calories per kilogram of hydrogen chloride absorbed. The thermal effect of the regenerating reaction depends on the nature of the regenerating agent. Regeneration by hydrogen produces about 127 Cal/kg hydrogen chloride produced, regeneration by compounds capable of addition reaction, as for instance ethylene, are thermally close to neutral, regeneration by aliphatic hydrocarbons consumes 250 to 300 Cal/kg hydrogen chloride formed, while regeneration by aromatic compounds consumes roughly one half as much as aliphatics.

The problem of carrying off the heat developed in the absorption, in order to prevent excessive temperature increases, and of adding heat to the regenerating reaction mass, in order to maintain reaction temperature, where that is necessary, can be solved by various of the conventional means. The simplest, but not generally applicable, principle is to choose the cycle so short that the combined heat capacity of reaction mass, equipment, other heat reservoirs and the passing gases is sufficient to maintain the temperature within the desired limits. Another method is heat exchange with a heating or cooling medium through heat conducting walls. This method was used in Examples 1 to 3, in which Dowtherm ® served as the heating and cooling medium, acting through steel pipes as heat conducting walls.

Another method, especially suitable for larger installations, is to use the reacting gas itself as the heat transfer medium by circulating it through the reaction mass and a cooling or heating device. The heating device can act through heat transfer walls, as in heat exchangers, steam heaters, etc. Cooling can be effected by analogous means, such as heat exchangers, steam boilers, water coolers, etc. or by internally cooling, such as spraying water, hydrochloric acid, chlorinated product, or other liquids into the gas and having them evaporate into it. This procedure has the advantage of permitting the recycling of the undesired compounds, such as hydrochloric acid, undesired chlorination stages in the product, etc. for utilization in the process.

In view of the comparatively small heat capacity of gases a fairly large quantity has to be circulated, typically about 5 to 15 times the original volume. In order to permit such quantities of gas to pass the reaction mass without undue pressure drop, the reaction mass has to be arranged in layers the thickness of which is a small fraction of the other dimensions. The problem of confining such layers in a compact reactor was solved, according to the present invention, by containing the reaction mass between vertical walls formed by louvres, and having the circulating gas pass horizontally through several such layers in parallel. Example 4 serves to illustrate the features discussed above.

EXAMPLE 4.

Figure 5:
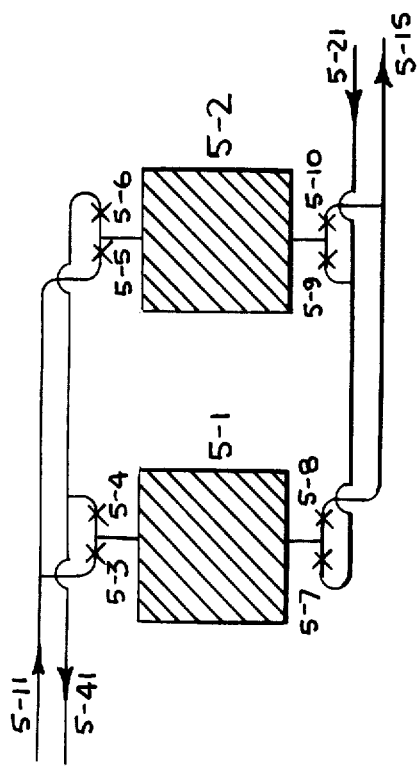
FIG. 5 is a schematic representation of adjunct equipment used with the equipment shown in FIG. 4.
Figure 6:
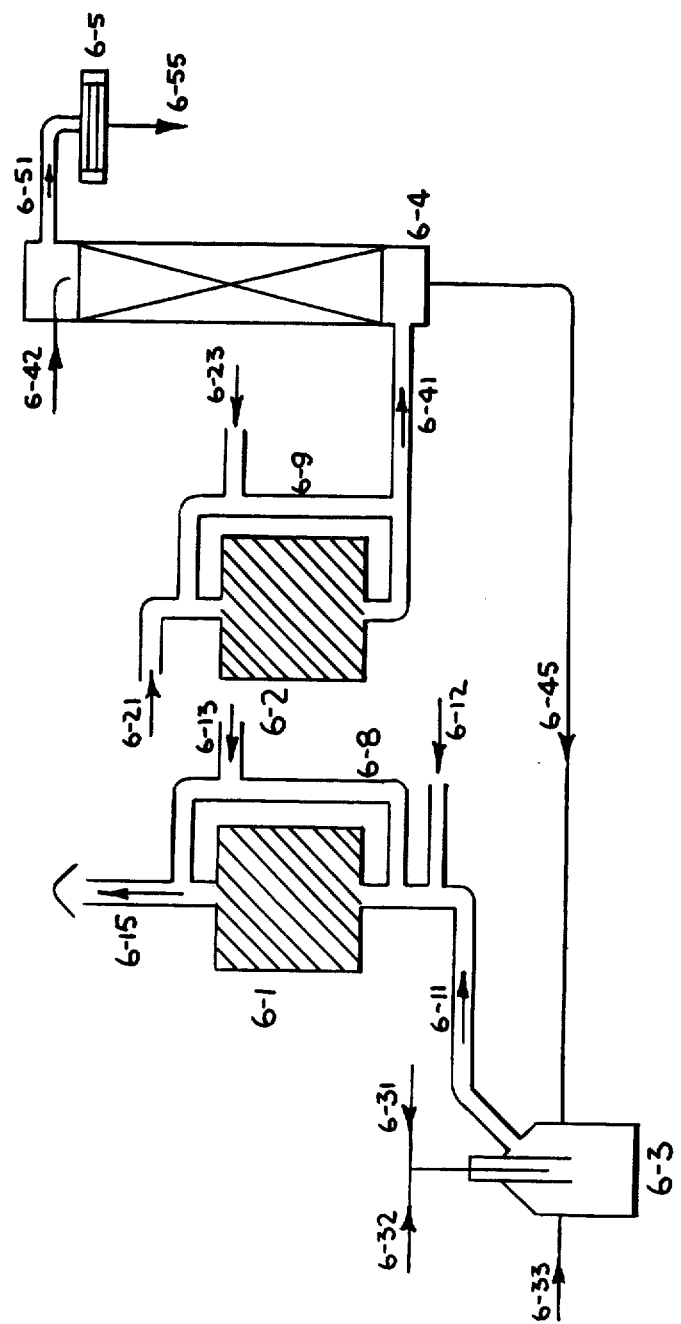
FIG. 6 is a schematic representation of another embodiment of the equipment for carrying out the process of this invention.

FIG. 6 is a schematic representation of the equipment. 6-1 and 6-2 are the reactors operating alternatingly, with their calculating ducts 6-8 and 6-9. 6-3 is a submerged burner, as conventionally used in the incineration of Cl-waste. 6-4 is a scrubbing column for the absorption of hydrogen chloride in water. The reactors 6-1 and 6-2 are connected with ducts for instance as shown in FIG. 5.

Figure 7:
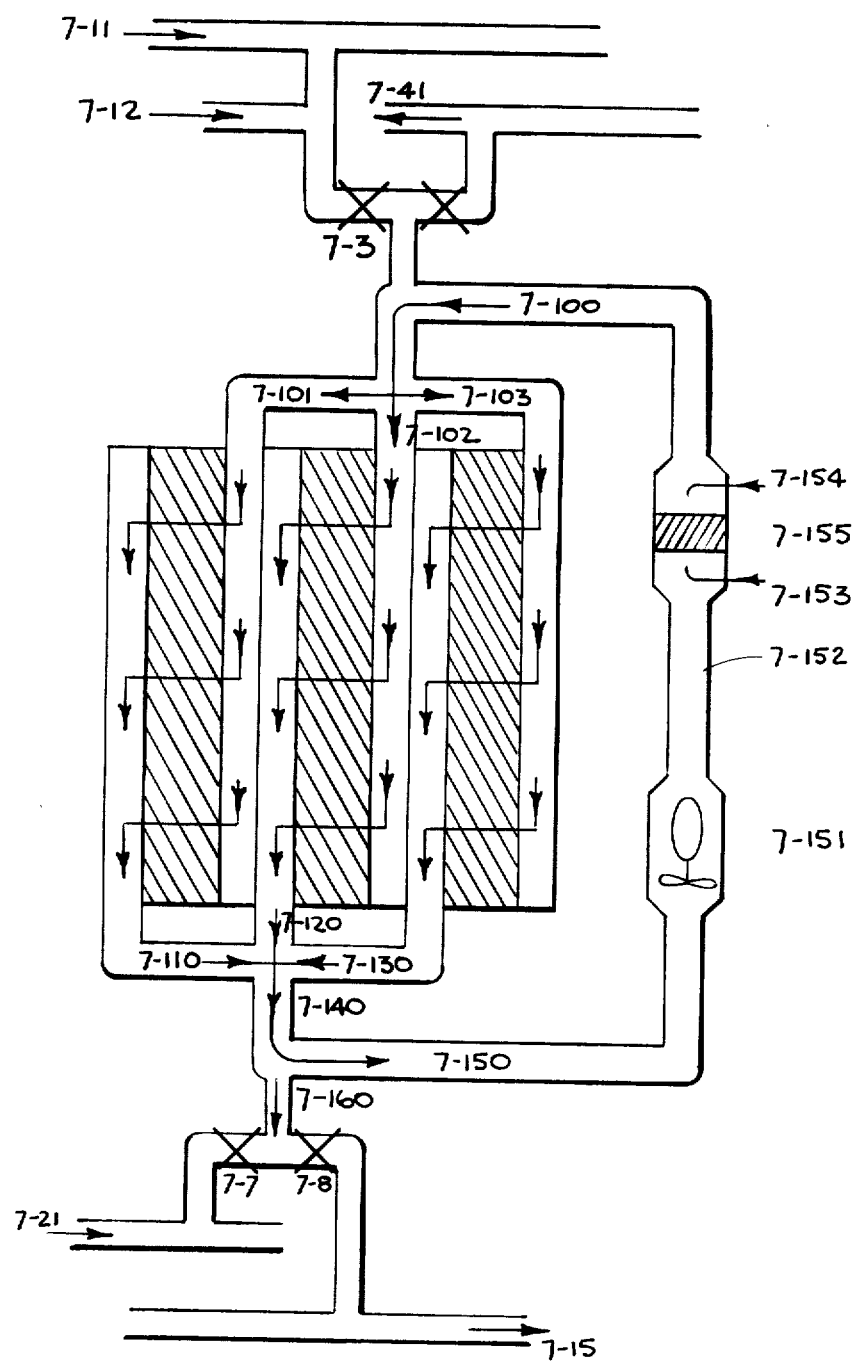
FIG. 7 is a more detailed schematic representation of a portion of the equipment shown in FIG. 6.

The interior arrangement of the reactors and their circulating ducts is shown schematically in FIG. 7. Discounting the Figure prefix, in FIG. 7 the meaning of the numbers below 100 is the same as in FIGS. 3, 4, 5, and 6.

In FIG. 7, the combustion gas enters at line 7-11, and passes through the open valve 7-3 into the reactor proper. Here it mixes with the circulated reaction gas entering through line 7-100. The gas splits into three streams, 7-101, 7-102, and 7-103. The shaded area represents the cross section of a layer of reaction mass contained between vertical louvre-type supports. Stream 7-101 passes the left layer, and emerges as 7-110, streams 7-102 and 7-103 pass the middle and the right layer, respectively, and emerge as streams 7-120 and 7-130, respectively. The three streams combine into stream 7-140. Most of it goes into the circulation system through line 7-150, while the volume corresponding to the entering volume leaves through line 7-160 and valve 7-8 to stack 7-15.

In FIG. 7 the two most important pieces of the circulation system are the blower, 7-151, and the cooler, 7-152. The circulation of the reaction gas can be effected by any of the conventional means for moving gases. Since, according to the present invention, it is desirable to have the direction of flow of the regenerating gas opposite to that of the combustion gas, it is preferred to use a device which permits reversal of flow, such as a propellor, axial compressor, etc. with reversible motor or blades. The cooler, 7-152, can either be a conventional heat interchanger, if desired in form of a steam generator, or it can be, as illustrated, a device for spraying the liquid to be evaporated (for instance dilute hydrochloric acid through line and spray nozzle 7-153, and chlorinated product through line and spray nozzle 7-154) and a device for eliminating unevaporated droplets, such as a de-mister, lattice of brickwork, etc., represented by the shaded area 7-155.

In FIG. 6, 800 kg/h of Cl-waste containing 79.7% chlorine are mixed with about 138 kg/h of fuel oil, in order to bring the chlorine content of the mixture to about 68%, a content which can be handled in one of the conventional submerged burners for chlorine waste. The mixture enters burner 6-3 through line 6-32. About 3900 kg/h of air enter through line 6-31. The flame burns into, and is quenched by evaporation of dilute hydrochloric acid, originating from the mixing of about 3300 kg/h of about 32% hydrochloric acid recycled through line 6-45, and about 1000 kg/h about 20% hydrochloric acid from an extraneous source entering through 6-33. Since combustion was carried out with a small excess of air, the air required for the absorption reaction (2 $CuCl+2$ $HCl+\frac{1}{2}$ $O_2=2$ $CuCl_2+H_2O$), about 2800 kg/h, is added through line 6-12 represented by 7-12 in FIG. 7. The gas-vapor-mixture entering reactor 6-1 or 6-2 through lines 6-11 or 6-21, respectively then consists of about 3161 kg/h water, 1912 kg/h hydrogen chloride, 727 kg/h oxygen, 985 kg/h carbon dioxide, and 5150 kg/h nitrogen. The reaction mass consists of about 80 cubic meters of pellets of aluminum silicate, as used as cracking catalyst in the petroleum industry, impregnated with about 20% cupric chloride, which had been reduced partly to cuprous chloride in a previous cycle. The reaction mass is arranged in five vertical layers, or frames, operating in parallel, and each measuring about 5 by 5 meters, with a thickness of about 0.75 meters, so that the whole reactor represents roughly a cube. An axial blower 7-151 circulates about eight times the volume of the mixture entering the system. The gas leaving the reaction mass 7-140 is at about 250° C. The temperature of the circulating gas 7-150 is lowered to about 210° C. in cooler 152 by injecting about 2000 kg/h 10% hydrochloric acid from extraneous sources into it through line 7-153. The temperature of it is further lowered to about 195° C. by mixing it 7-100 with the combustion gas entering through valve 7-3. The temperatures are controlled by the quantity of liquid injected through 7-153 and by the rate of circulation of the gas. The quantity of hydrochloric acid injected into 6-3 through line 6-33 is controlled so that a small quantity only, sufficient to remove particulates, leaves the burner as liquid.

In FIG. 7 the combustion gas, free of chlorine and hydrogen chloride, leaves the reactor through line 7-160, valve 7-8 and stack 7-15 represented by 6-15 in FIG. 6. The composition of this gas is about 5482 kg/h water, 5152 kg/h nitrogen, 264 kg/h oxygen and 985 kg/h carbon dioxide.

After an operation of about thirty minutes in this manner, about 2870 kg of cuprous chloride have been converted to cupric chloride. They are regenerated or reduced to cuprous chloride in the next thirty minutes cycle by reaction with natural gas entering through lines 6-13 or 6-23, respectively.

In FIG. 7 a natural gas, containing about 90% methane, enters the system at the rate of about 3500 SCF (Standard Cubic Feet) through line 7-21 and valve 7-7. The direction of the revolving gas in line 7-150 is reversed. The incoming gas is mixed with the circulating gas. The gas passes through the reaction mass in a direction opposite to that shown by the arrows. About 90% of it is drawn into line 7-100. The heat required for maintaining the reaction temperature is supplied by heat interchange with an external source of heat, for instance a burner of natural gas, or with the circulating gas of the other reactor, or by any of the other conventional means of heating gases. The gas leaving the system through line 7-41 represented by 6-41 in FIG. 6 is freed of hydrogen chloride in column 6-4, by scrubbing with water entering through lines 6-42 in the conventional way. The vapors emerging from 6-4 through line 6-51 are cooled in condenser 6-5. The uncondensables are, after taking off an appropriate quantity as purge, recycled into the reactor system. The condensate is separated into water and chlorinated product consisting of about 80% of carbon tetrachloride. The lower chloromethanes can be recycled to the reaction system. The production of carbon tetrachloride is about 1000 kg/h.

Two of the reactions used in this process, namely incineration and absorption, are exothermic. The heat generated by them can be used to simplify operation and equipment, thus lowering the investment, as shown in Example 1. It can also be used for the evaporation, and thus utilization, of internally, or externally generated hydrochloric acid, as shown in Examples 3 and 4.

Another way of utilizing this heat is shown in Example 5.

EXAMPLE 5.

Figure 8:
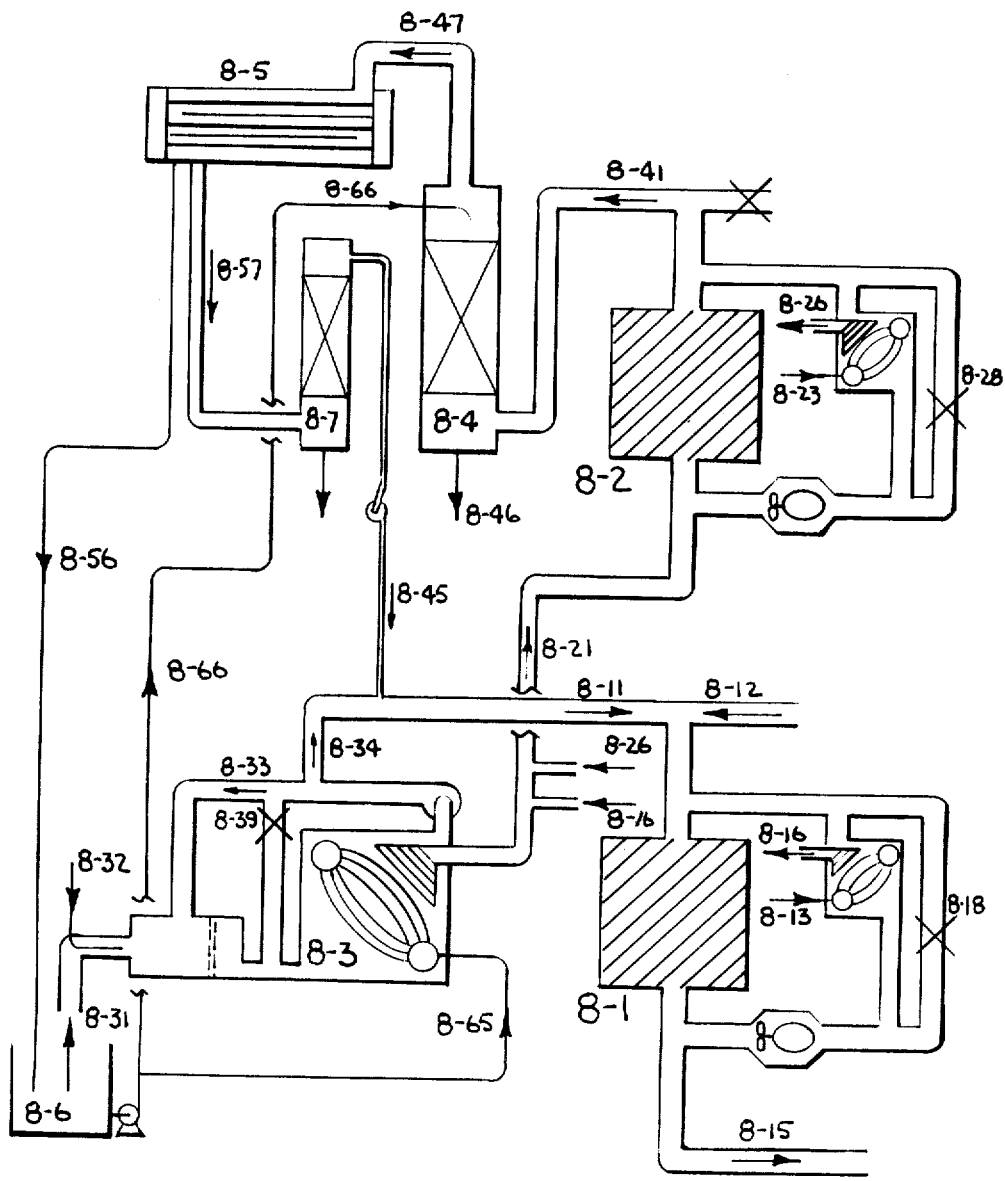
FIG. 8 is a schematic representation of still another embodiment of the equipment for carrying out the process of this invention.

Most organic compounds can form chlorination products of different chlorine content. The chlorine content is normally a function of the ratio of chlorinating agent to substrate. Taking the chlorination of benzene as a concrete example, the ratio of dichlorobenzene to monochlorobenzene increases, in first approximation, proportionally to the ratio of chlorine to benzene. If, as normally, monochlorobenzene is preferred to more highly chlorinated benzenes, the ratio of benzene to chlorinating agent should be kept as high as possible. Applied to the present invention, that means, that, if the reaction mass is to be regenerated by means of benzene, the largest possible quantity of benzene vapor should be reacted with the given quantity of reaction mass, or, in other words, all available heat should be used for evaporating and superheating benzene. One way of accomplishing that is shown in FIG. 8. It is obvious that an analogous method is applicable in all cases in which a lower chlorination stage of a compound capable of various chlorination stages is desired.

FIG. 8 is a schematic representation of the equipment. 3000 kg/h of a Cl-waste containing 65% chlorine, entering at 8-32, are burned with about 15,000 kg/h of air, representing an excess of about 10%, entering at 8-31. The combustion gas is cooled to about 600° C. by cool combustion gas recycled through line 8-33, in order to minimize the danger of corrosion of the heating tubes, and decomposition of benzene in them. The combustion gas passes a wall of brick checkerwork in order to ensure mixing and prevent radiation, and enters a conventional evaporator. Liquid benzene is fed through line 8-65 into the evaporator 8-3. The benzene vapors pass a conventional superheater and leave through line 8-21. By passing the benzene evaporator, the combustion gas has been cooled to about 200° C. It leaves through the recycle blower and line 8-33. While the greater part of it returns into the combustion chamber, where it cools the combustion gas, the portion equivalent to the quantities entering at 8-31 and 8-32 is taken off through line 8-34 passing through lines 8-11 into reactor 8-1. A bypass with damper 8-39 serves to control the temperature. 8-1 and 8-2 represent reactors essentially of the type described in Example 4, FIG. 7. They are connected as shown in FIG. 5. 8-1 represents the reactor absorbing chlorine and hydrogen chloride from the combustion gas, 8-2 the reactor being regenerated by benzene vapor.

The combustion gas leaving the combustion chamber and benzene evaporator by line 8-34 contains about, in kg/h: Oxygen 347, nitrogen 11,625, hydrogen chloride 2005, water 853 and carbon dioxide 3295. It is mixed with about 2005 anhydrous hydrogen chloride entering through line 8-45. Further, about 4500 kg/h air is added through line 8-12. The mixture passes through the reaction mass in reactor 8-1 leaving it through stack 8-15. The reactor contains about 62 cubic meters of a reaction mass prepared as follows:

100 parts by weight of commercial aluminum hydroxide are dissolved in about 1500 parts of hot 10% sodium hydroxide solution.

50 parts of commercial copper chloride ($CuCl_2.2H_2O$) are dissolved in about 385 parts of 30% hydrochloric acid.

Each solution is diluted with water to about 5000 parts. The copper chloride solution is added slowly, with good agitation, to the alumina solution. The slurry is neutralized by the addition of small quantities of either sodium hydroxide or hydrochloric acid. It is then passed through a filter press, washed with water until it is essentially free of sodium chloride, dried, broken and screened. Grains between $2\frac{1}{2}$ and $3\frac{1}{2}$ mesh are heated for about two hours to about 400° C., and used as reaction mass. The fines are ground and added to the next batch.

Each reactor contains about 62 cubic meters of this reaction mass, arranged in 10 vertical layers of about 0.25 meters thickness, and 5×5 meters sides, which the combustion gas passes in parallel. The reactor is cooled by circulating about ten times the volume of the entering gas, as described in Example 4. In this case, the circulating gas is cooled by passing through a small evaporator for benzene, combined with a superheater for the benzene vapors. Liquid benzene enters through line 8-13, and superheated benzene vapor leaves through line 8-16. Reactor 8-1 is operated this way for about 15 minutes. It is then purged with steam and shifted, as explained in previous examples, to the regeneration cycle.

While reactor 8-1 is absorbing, as described above, reactor 8-2 is regenerated by passing benzene vapors through the reaction mass. The benzene vapors originate in the three benzene evaporators, which they enter by lines 8-13, 8-65, and 8-23 respectively and leave by lines 8-16, 8-21, and 8-26. The benzene vapor enter reactor 8-2 through line 8-21 (or reactor 8-1 through line 8-12, respectively) at about 150° C., is heated to about 200° C. by mixing with the circulating gas, and leaves at about 220° C. through line 8-41. The quantity of heat removed from the reactor system, and thus the reaction temperature is controlled by a damper, 8-18 and 8-28, in each of the systems.

The quantity of benzene evaporated and superheated in the three evaporators depends on the degree of utilization of the available heat. Under favorable conditions about 60,000 kg/h benzene can be passed through the reactors. Since only about 4000 kg/h are chlorinated, the ratio of chlorinating agent to substrate is very favorable, and only about 6% of the benzene reacting is converted to higher chlorobenzenes.

The mixture of benzene and chlorinated benzene with hydrogen chloride passes through line 8-41 into column 8-4. By irrigation with benzene entering through line 8-66 the chlorinated benzene is scrubbed out, and leaves the column through line 8-46. The mixture is separated by distillation or other conventional means into benzene, returned to the system, preferably as vapor, product chlorobenzene, and higher chlorobenzenes. The latter can be added, if otherwise unusable, to the Cl-waste. The yield of monochlorobenzene is about 5300 kg/h.

The tops of column 8-4, containing most of the benzene and the hydrogen chloride, enter condenser 8-5 through line 8-47. The condensate goes through line 8-56 to benzene circulating tank 8-6. The hydrogen chloride goes through line 8-57 to scrubbing column 8-7, where the benzene remaining in the gas is recovered in the conventional way. The hydrogen chloride, essentially free of benzene, is recycled through line 8-45 to the absorbing reactor. The benzene recovered by, for instance, distillation of the effluent of columns 8-4 and 8-7, as well as the fresh benzene in a quantity of about 4333 kg/h, are added to tank 8-6.

EXAMPLE 6.

In the previous examples the spent reaction mass was regenerated by agents taking up by substitution the chlorine accumulated in the reaction mass. Thereby hydrogen chloride was produced, which, unless otherwise used, had to be recycled. It thereby doubled the load on the absorption system. In the present example the spent reaction mass is regenerated by an agent taking up the chlorine stored in the reaction mass by addition to a double bond, without essential production of hydrogen chloride. Of the several agents suitable for that purpose this example demonstrates the use of ethylene. Ethylene is the preferred agent acting by addition to a double bond, because it is readily available, and because the product, ethylene dichloride, is of considerable commercial importance, mainly as intermediate in the production of vinyl chloride.

This example further illustrates the use of a fluidized bed of reaction mass, as opposed to the stationary and moving beds used in the previous examples.

Figure 9:
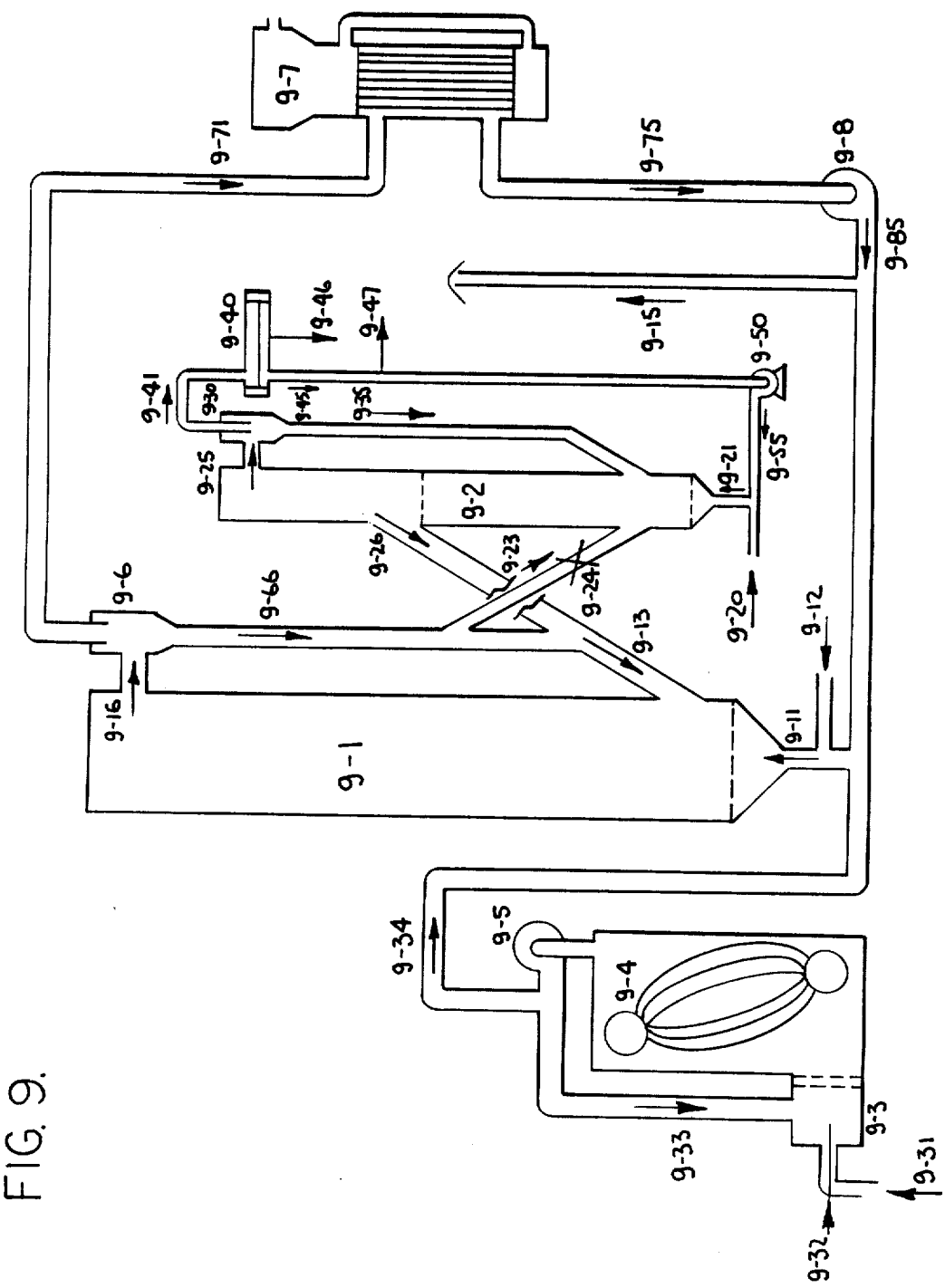
FIG. 9 is a schematic representation of another embodiment of the equipment for carrying out the process of this invention.

FIG. 9 is a schematic diagram of the equipment. The same quantity of the same Cl-waste as in Example 5 enters combustion system 9-3 through line 9-32, and is burned with the same quantity of air, entering through line 9-31. The combustion gas is cooled to about 600° C. by recirculation of part of the cooled gas through blower 9-5 and line 9-33. The temperature of the flue gas is reduced to about 200° C. by passing a steam boiler 9-4. The cool gas passes through line 9-34 and 9-11 into reactor 9-1. Reactor 9-1 is partly filled with the reaction mass consisting of grains of about 20 to 80$\mu$ diameter of a surface active aluminum silicate, for instance as conventionally used as catalyst in the petroleum industry, impregnated with about 15% copper chloride. A mixture of flue gas and reaction mass leaves reactor 9-1 through line 9-16. Reaction mass is separated in cyclone 9-6 and returns through line 9-66. The flue gas goes through line 9-71 to steam boiler 9-7, in which it is cooled from about 240° C. to about 200° C. It passes through line 9-75, blower 9-8 and line 9-85 partly to stack 9-15, mostly back to line 9-11 and reactor 9-1. The air required for the absorption is added through line 9-12 in the same quantity as in Example 3.

The temperature of the gas passing blower 9-8 is controlled preferably by adjusting the pressure of the steam generated in 9-7. The flow through 9-8 is controlled so that a considerable portion of the reaction mass in 9-1 is carried up and out through line 9-16. This reaction mass is separated in cyclone 9-6 and passes through line 9-66. Most of it returns through lines 9-66 and 9-13 to 9-1, while part of it, controlled by valve 9-24, passes through line 9-23 into reactor 9-2. Ethylene is added to the system through line 9-20. It is mixed with the recycle gas in line 9-55, and enters reactor 9-2 through line 9-21. Unreacted ethylene and ethylene dichloride leave reactor 9-2, with a little reaction mass, through line 9-25. The reaction mass is separated in cyclone 9-30, and returns through line 9-35 to reactor 9-2. The gas goes through line 9-41 to condenser 9-40, where most of the ethylene dichloride is condensed and leaves as product through line 9-46. The uncondensed portion passes through line 9-45 to blower 9-50, and from there through lines 9-55 and 9-21 back into reactor 9-2. The flow through blower 9-50 is controlled so that the bed of reaction mass in reactor 9-2 is maintained in a state of very mild fluidization, forming a fairly well defined level at outlet 9-26. The reaction mass overflowing at 9-26 returns to reactor 9-1 through line 9-13. A small part of the gas from condenser 9-40 is taken off as purge through line 9-47 and returned to burner 9-3 for combustion. The system produces about 2500 kg/h ethylene dichloride.

In the previous examples the copper salts were distributed in solid carriers, in order to provide the large surface required for rapid reaction with the combustion and regeneration gases. In certain cases it is possible to dissolve the copper salts in a liquid carrier, and cause the intimate contact with the reacting gases by the conventional means for gas-liquid contact, such as spargers, packed columns, spray towers, etc. The preferred liquid carrier in this case is an essentially saturated solution of the copper salts in water, with or without additional copper salts suspended in it, forming a slurry. The following example shows one implementation of this method of disposing of combustion gases of Cl-waste. The contact between combustion gas and absorbing liquor is effected in a packed tower. The regenerating medium is ethylene. The regeneration by ethylene requires practically a temperature of about 150° C., although a slow regeneration can be observed at temperatures as low as 100° C.. The presence of water promotes the hydrolysis of ethylene dichloride. It is, therefore, preferred to remove the ethylene dichloride out of the reaction mixture by entraining it in a current of ethylene. Ethylene entrains, of course, simultaneously water. In order to keep the quantity of the entrained water low, the pressure of ethylene should be several times as large as the vapor pressure of water out of its solution. For the following example a pressure of about 20 atmosphers was selected.

EXAMPLE 7.

Figure 10:
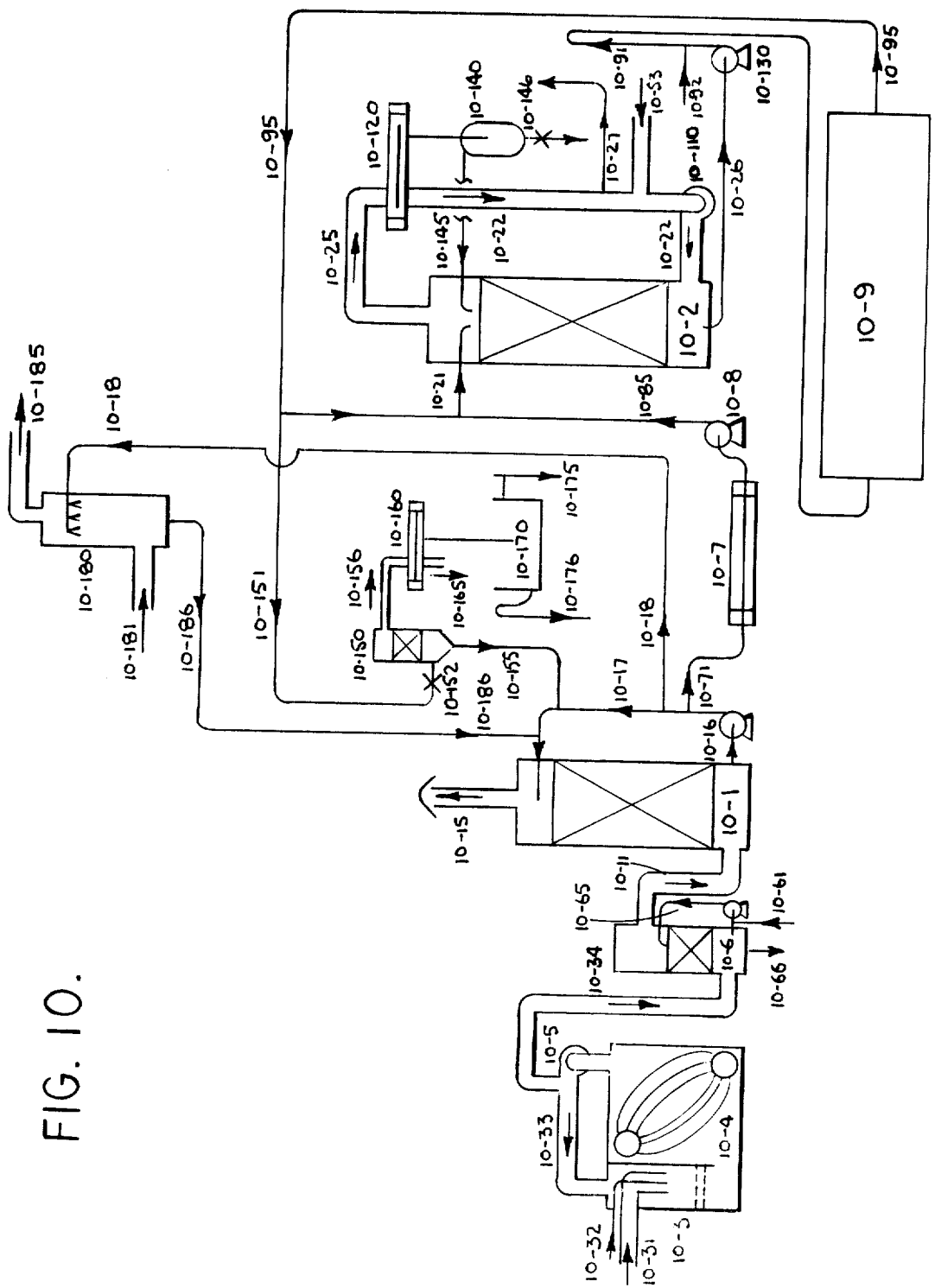
FIG. 10 is a schematic representation of another embodiment of the equipment for carrying out the process of this invention.

FIG. 10 is a schematic representation of the equipment used in this example. 5000 kg/h Cl-waste containing 70% chlorine enter burner 10-3 through line 10-32 and are burned with about 27,780 kg/h air entering through line 10-31. The combustion gas is cooled, by mixing with cool combustion gas recycled by blower 10-5 through line 10-33, to about 600° C. It passes a device for reducing its temperature to about 200° C., such as a regenerator or, as symbolized here, a steam boiler 10-4. It passes through line 10-34 to column 10-6. Here it is cooled by contact with about 26% hydrochloric acid, circulating by pump through line 10-65, to about 70° C. About 1500 kg/h water are added through line 10-61 to replace the evaporated water. This column serves further to arrest particulates, metal salts, and other incombustible substances that may occur in Cl-waste. They are removed, as required, by draining part of the circulating acid off through line 10-66. The clean moist combustion gas goes through line 10-11 to column 10-1. Here it is contacted with an aqueous solution of cuprous and cupric chloride, in which in addition either or both salts may be suspended forming a slurry. Column 10-1 is a steel shell, lined with rubber and acid proof bricks. Its inside diameter is about 3.3 meters. The packing consists of about 5 meters height of 2" porcelain saddles. It is irrigated by about 50 cubic meters per hour of said solution-slurry circulated by pump 10-16 through line 10-17. The combustion gas free of chlorine and hydrogen chloride leaves through stack 10-15. The spent copper slurry leaves the column through line 10-71. It is heated in heater 10-7 to about 120° C. By means of a pressure pump 10-8 it is pumped against a pressure of about 22 atmospheres through lines 10-85 and 10-21 into the regenerator system. The latter comprises reactor 10-2 and soaker 10-9. Reactor 10-2 is a pressure column of steel, rubber-lined and brick-lined, having an internal diameter of about 1.6 m. It is packed with about 3 meters height of 2" procelain saddles. The irrigation comprises about 300 cubic meters per hour, entering through line 10-21. About 2000 kg/h of ethylene enter the system through line 10-53. The gas is circulated by blower 10-110 through line 10-22 to reactor 10-2, line 10-25 and condenser 10-120 at the rate of about 11,000 kg/h. During the contact between gas and liquor in the packing of reactor 10-2 the gas entrains most of the ethylene dichloride contained in the liquor, and saturates the liquor with ethylene. The gas is cooled in condenser 10-120, condensing most of the ethylene dichloride and water entrained from reactor 10-2. The gas returns through line 10-22 and blower 10-110 to reactor 10-2. It is preferred to heat the recycled gas by heat interchange between lines 10-22 and 10-25, and a steam heater in line 10-22 between 10-110 and 10-2. (Not shown in order not to complicate the sketch.)

At the operating temperature of about 150° C. the reaction between copper chloride and ethylene is fairly slow. In order to give it time for completion, soaker 10-9 is provided. It is a steel tank, rubber- and brick-lined, having a capacity of about 75 cubic meters. The liquor leaving the bottom of reactor 10-2, saturated with ethylene, through line 10-26 is pumped by pump 10-130 and line 10-91 into the soaker. The reaction between the ethylene dissolved in the liquor and copper chloride proceeds during the passage of the liquor through the soaker. The liquor leaving the soaker passes through line 10-95 and 10-21 back to reactor 10-2, where the ethylene consumed in the regeneration is replaced, and the ethylene dichloride is stripped off. The heat losses are replaced by feeding about 3000 kg/h steam through line 10-92 into the system. The ethylene dichloride condensed in 10-120 is separated in separator 10-140 from water, which returns through line 10-145 to 10-2. Ethylene dichloride is released through valve 10-146 to purification. Production is about 4000 kg/h.

Depending on the purity of the ethylene, undesired gases may accumulate in the system. They are removed by purging through line 10-27, and recovering valuable constituents in the conventional manner.

The copper liquor regenerated in 10-2 and 10-9 returns to reactor 10-1 through lines 10-151, pressure release valve 10-152, flasher 10-150, and line 10-155. Entering 10-150 at about 150° C., part of the excess heat is released, after passing 10-152, in form of vapor. The vapor entrains most of the ethylene dichloride and ethylene dissolved in the liquor. The vapor goes through line 10-156 to condenser 10-160, where water and ethylene dichloride are condensed, while ethylene passes on through line 10-165 to compression and is recycled into 10-53. The condensate is separated in separator 10-170 into water, line 10-175, and ethylene dichloride, returning to purification through line 10-176. The temperature of the bulk of the liquor has been reduced to about 115° C. by flashing. It returns as regenerated copper liquor to reactor 10-1 through line 10-155.

Certain byproducts of higher boiling points are not stripped out of the copper liquor, and tend to accumulate in it. They are removed by purging a part of the circulating liquor through line 10-18, and separating the copper moiety from the aqueous moiety. Such separation can be effected by any of various conventional ways. For instance, the copper content can be precipitated as cuprous chloride by passing sulfur dioxide into the solution. The cuprous chloride is filtered off, leaving the water with the impurities in the filtrate. The pure cuprous chloride is returned into the system. Another method is to precipitate the copper content by means of alkali or ammonia in form of cupric and cuprous hydroxide, filtering it off, and dissolving it in hydrochloric acid, reforming cuprous and cupric chloride to be returned into the system. Another way, shown here, is to effect the separation by evaporation of the aqueous moiety.

The quantity to be purged is taken off through line 10-18, and sprayed into spray tower 10-180. Hot air enters through line 10-181, and leaves through line 10-185 with the water and the impurities. The dry copper chloride collects in the bottom of 10-180, is dissolved in water and recycled to reactor 10-1 through line 10-186.

In order to better understand the operation of the system described in Example 7, it should be remembered that, although cuprous chloride is essentially insoluble in water by itself, the presence of cupric chloride makes it soluble to the extent of roughly 15% of the cupric chloride present, and that the presence of ethylene, with which it forms a compound, further enhances it solubility to a very considerable extent. It was further observed that the copper salts remained in solution under conditions under which precipitation would have been expected even taking all known solubilizing influences into account. Therefore, although in some places and under some conditions the copper liquor is in form of a slurry, the process as described here deals mostly with true solutions. The essential reactions, however, occur just as readily with slurries as with solutions, so that the limits of solubility of the ingredients do not constitute limits of operation.

Any agent capable of reducing cupric chloride to cuprous chloride can be employed as a reducing or regenerating agent, including inorganic as well as organic agents.

A typical inorganic agent is hydrogen. Other inorganic agents are watergas and ammonia.

Typical organic agent include the following:

(1) Aliphatic hydrocarbons of the general formula $$H(CH_2)_nH$$

where n is 1 or greater, for example from 1 to 6, or greater, such as methane, ethane, propane, butane, hexane, etc., including mixtures thereof.

Also included are branched aliphatic hydrocarbons such as isopropane, isobutane, dimethylbutane, etc.

(2) Cycloaliphatic hydrocarbons such as those of the general formula

where  indicates a ring structure where n is 3-7 or more.

(3) Aromatic hydrocarbons of the general formula

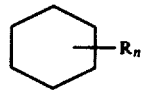

where R indicates a substituted group such as alkyl, cycloalkyl, etc. and n the number of times it is substituted on the ring for example 0-3 or more, such as benzene, alkylbenzenes such as toluene, xylene, ethylbenzene, etc.

(4) Unsaturated hydrocarbons for example of the general formula $R-CH=CH_2$, where R is hydrogen or alkyl, cycloalkyl, aryl, etc., such as ethylene, propylene, butylene, etc., styrene, etc.; acetylenic compounds for example of the general formula $R\ C\equiv CH$ where R is hydrogen or alkyl, cycloalkyl, aryl, etc.

Also included are compounds containing more than one of the above reducing moieties, mixtures of the above reducing compounds, derivatives of the above such as halogenated derivatives thereof, etc.

The choice of the particular reducing or regenerating agent employed is generally governed by economic considerations.

The reducing or regenerating agent is oxidized in the reaction, oxidation resulting in a chlorinated compound. Thus, the term "oxidized" or "chlorinated" can be used interchangeably.

Many of the features of this invention are mentioned in connection with one particular example only. That should be no means be interpreted as meaning that they are applicable to the operation according to that particular example only. As any one skilled in the art will see, very many different combinations of the various features of this invention are practicable. For instance: The incineration can take place in a free, submerged, catalytic or any other suitable type of burner, independent of the subsequent operation. The cooling of the combustion gas can be effected by regenerators, steamboilers, by spraying of hydrochloric acid, or any combination of these methods, independent of the selection of the other features. Particulates, soot, metal compounds, etc., can be removed, where the nature of the Cl-waste requires it, by scrubbing with hydrochloric acid, or by any other suitable means, independent of the nature of the reaction mass, the type of regenerating gas, etc. The reaction mass can be solid or liquid, stationary or moving or fluidized, in pipes or between louvres, independent of the preceding treatment of the combustion gas, etc.

I claim:

1. The process of removing chlorine and hydrogen chloride from a combustion gas formed from the incineration of chlorine-containing organic materials which comprises the following separate steps:
   (1) The absorbing step of contacting, in the presence of oxygen, said combustion gas at a temperature below about 300° C., with a solid granular mass containing cuprous chloride in a quantity sufficient to absorb chlorine and hydrogen chloride present in the gas and to convert cuprous copper to cupric copper; and
   (2) The regeneration step of contacting cupric copper formed in (1) with a reducing agent capable of regenerating cupric copper to cuprous copper and forming a chlorinated reducing agent; and
   (3) The step of disposing of said treated combustion gas in an environmentally unobjectionable manner.

2. The process of claim 1 where the chlorinated reducing agent is recovered as a product from the reaction.

3. The process of claim 2 where the process is repeated employing the cuprous copper of step (2) in step (1).

4. Claim according to 3, where the reaction is carried out in the presence of a solid granular mass arranged in two stationary beds, alternatingly in the absorbing and the regenerating steps.

5. Claim according to 3, where the reaction is carried out in he presence of a solid granular mass which moves continuously or intermittently from the absorbing to the regenerating steps and reverse.

6. Claim according to 3, where the reaction is carried out in the presence of a solid granular mass which moves in fluidized form from the absorbing to the regenerating reaction steps and reverse.

7. Claim according to 3, where the reducing agent is hydrogen.

8. Claim according to 3, where the reducing agent is methane.

9. Claim according to 3, where the reducing agent is an aliphatic hydrocarbon.

10. Claim according to 3, where the reducing agent is vaporous benzene.

11. Claim according to 3, where the reducing agent is ethylene.

12. Claim according to 8, where the chlorinated reducing agent product is chlorinated methane.

13. Claim according to 12, where the chlorinated reducing agent product is carbon tetrachloride.

14. Claim according to 9, where the chlorinated reducing agent product is chlorinated ethane.

15. Claim according to 11, where the chlorinated reducing agent product is ethylene dichloride.

16. Claim according to 10, where the chlorinated reducing agent product is monochlorobenzene.

17. Claim according to 3, where the temperature of the absorbing step is between 25° C. and 300° C., and the temperature of the regeneration step is between 100° C. and 300° C.

18. Claim according to 3, where the temperature of the absorbing step is between 50° C. and 250° C., and the temperature of the regeneration step is between 130° C. and 250° C.

* * * * *